(12) United States Patent
Kwon et al.

(10) Patent No.: US 12,458,970 B2
(45) Date of Patent: Nov. 4, 2025

(54) LIGHT-DIGITAL PCR CHAMBER AND LIGHT-DIGITAL PCR DEVICE USING SAME

(71) Applicant: KOREA RESEARCH INSTITUTE OF BIOSCIENCE AND BIOTECHNOLOGY, Daejeon (KR)

(72) Inventors: Oh Seok Kwon, Daejeon (KR); Kyung Ho Kim, Daejeon (KR); Seon Joo Park, Daejeon (KR); Seong Eun Seo, Daejeon (KR); Tai Hwan Ha, Daejeon (KR)

(73) Assignee: KOREA RESEARCH INSTITUTE OF BIOSCIENCE AND BIOTECHNOLOGY, Daejeon (KR)

( * ) Notice: Subject to any disclaimer, the term of this patent is extended or adjusted under 35 U.S.C. 154(b) by 943 days.

(21) Appl. No.: 17/291,180

(22) PCT Filed: Nov. 19, 2019

(86) PCT No.: PCT/KR2019/015897
§ 371 (c)(1),
(2) Date: May 4, 2021

(87) PCT Pub. No.: WO2020/106045
PCT Pub. Date: May 28, 2020

(65) Prior Publication Data
US 2022/0062888 A1  Mar. 3, 2022

(30) Foreign Application Priority Data
Nov. 19, 2018  (KR) .......................... 10-2018-0142944

(51) Int. Cl.
*B01L 3/00* (2006.01)
(52) U.S. Cl.
CPC ......... *B01L 3/508* (2013.01); *B01L 3/502715* (2013.01); *B01L 2300/0861* (2013.01);
(Continued)

(58) Field of Classification Search
CPC .............. B01L 3/508; B01L 3/502715; B01L 2300/0861; B01L 2300/0887; B01L 2300/12; B01L 2300/168
See application file for complete search history.

(56) References Cited

U.S. PATENT DOCUMENTS

| 7,998,708 B2 | 8/2011 | Handique et al. |
| 8,323,900 B2 | 12/2012 | Handique et al. |

(Continued)

FOREIGN PATENT DOCUMENTS

| CN | 1526827 A | 9/2004 |
| CN | 104830160 A | 8/2015 |

(Continued)

OTHER PUBLICATIONS

Extended European Search Report dated Dec. 16, 2021 issued in corresponding European Appln. No. 19886397.9.

(Continued)

*Primary Examiner* — Elizabeth A Robinson
*Assistant Examiner* — Tingchen Shi
(74) *Attorney, Agent, or Firm* — Harness, Dickey & Pierce, P.L.C.

(57) ABSTRACT

The present invention relates to a light-digital PCR chamber and a light-digital PCR device. The light-digital PCR chamber comprises: a transparent substrate; a metal thin film layer formed on the transparent substrate; a light shielding layer formed on the metal thin film layer; and a microchannel structure formed on the light shielding layer. The light-digital PCR device comprises a laminate comprising a transparent substrate, a metal thin film layer formed on the transparent substrate, and a light shielding layer formed on the metal thin film layer.

11 Claims, 16 Drawing Sheets

(52) U.S. Cl.
CPC ... *B01L 2300/0887* (2013.01); *B01L 2300/12* (2013.01); *B01L 2300/168* (2013.01)

(56) References Cited

U.S. PATENT DOCUMENTS

| | | | |
|---|---|---|---|
| 8,822,148 | B2 | 9/2014 | Ismagliov et al. |
| 9,506,870 | B2 | 11/2016 | Ogusu |
| 9,901,923 | B2 | 2/2018 | Lee et al. |
| 10,766,034 | B2 | 9/2020 | Lee et al. |
| 2006/0051214 | A1 | 3/2006 | Ussing |
| 2007/0042367 | A1 | 2/2007 | Tao et al. |
| 2008/0182301 | A1 | 7/2008 | Handique et al. |
| 2011/0027834 | A1* | 2/2011 | Tetzner ............... C12Q 1/6848 435/183 |
| 2011/0207140 | A1 | 8/2011 | Handique et al. |
| 2013/0101990 | A1 | 4/2013 | Handique et al. |
| 2014/0024126 | A1 | 1/2014 | Ogusu |
| 2015/0315631 | A1 | 11/2015 | Handique et al. |
| 2015/0352539 | A1 | 12/2015 | Miyajima et al. |
| 2017/0354967 | A1 | 12/2017 | Tao et al. |
| 2018/0080064 | A1 | 3/2018 | Lee et al. |
| 2018/0214863 | A1* | 8/2018 | Sui ................... G01N 23/20025 |
| 2018/0236451 | A1 | 8/2018 | Lee et al. |
| 2019/0032114 | A1 | 1/2019 | Trivedi |
| 2021/0008562 | A1 | 1/2021 | Lee et al. |
| 2021/0010059 | A1 | 1/2021 | Handique et al. |

FOREIGN PATENT DOCUMENTS

| | | | | |
|---|---|---|---|---|
| JP | 2003-021635 | A | 1/2003 | |
| JP | 4502167 | B | 7/2010 | |
| JP | 2014-020920 | A | 2/2014 | |
| JP | 2019-146593 | A | 9/2019 | |
| KR | 10-2009-0021957 | A | 3/2009 | |
| KR | 10-2010-0006842 | A | 1/2010 | |
| KR | 10-2013-0088927 | A | 8/2013 | |
| KR | 10-2017-0106995 | A | 9/2017 | |
| WO | WO-2004/016948 | A1 | 2/2004 | |
| WO | WO-2016-115542 | A | 7/2016 | |
| WO | WO-2017019768 | A1 * | 2/2017 | ............ C12Q 1/686 |
| WO | WO-2017-127570 | A | 7/2017 | |

OTHER PUBLICATIONS

Chinese Office Action dated Apr. 25, 2022 issued in corresponding Chinese Appln. No. 201980074688.9 (with English translation).
Japanese Office Action dated May 24, 2022 issued in corresponding Japanese Appln. No. 2021-527238.
Heon-Ho Jeong et al., Droplet-based Microfluidic Device for High-throughput Screening. Korean Chem. Eng. Res., 52(2), (2014) pp. 141-153.
Elizabeth A. Ottesen et al., Microfluidic Digital PCR Enables Multigene Analysis of Individual Environmental Bacteria. Science 314, (2006) pp. 1464-1467.
International Search Report PCT/ISA/210 and Written Opinion of the International Searching Authority PCT/ISA/237 for International Application No. PCT/KR2019/015897 dated Feb. 26, 2020.

* cited by examiner

LIGHT-DIGITAL PCR CHAMBER AND LIGHT-DIGITAL PCR DEVICE USING SAME

This application is a national phase under 35 U.S.C. § 371 of PCT International Application No. PCT/KR2019/015897 which has an International filing date of Nov. 19, 2019, which claims priority to Korean Application No. 10-2018-0142944, filed Nov. 19, 2018, the entire contents of each of which are hereby incorporated by reference.

TECHNICAL FIELD

The present invention relates to a light-digital PCR chamber and a light-digital PCR device using the same.

BACKGROUND ART

A polymerase chain reaction (PCR) method is a technique for amplifying a specific region of a nucleic acid (DNA or RNA) in a large amount in vitro. PCR equipment using the technique is used to amplify a small amount of DNA in the blood in hospitals and research institutes, and the PCR equipment is also used to diagnose various diseases such as malaria, tuberculosis, and hepatitis.

The PCR method has recently been developed to real-time PCR, digital PCR, etc., and provides results having a variety of convenience, such as real-time diagnosis, high sensitivity, and digitalization of measurement results, and high accuracy, which have been not provided by existing PCR.

Among them, the digital PCR is a new method of detecting and quantitatively analyzing nucleic acids (DNA or RNA), and the digital PCR reaction is performed individually in hundreds or thousands of divided samples in a sample, so that there is an advantage of being able to perform sensitive measurement only with a small amount of sample. In addition, various types of samples may be processed simultaneously, so that there is an advantage of being able to be applied to various ranges.

The digital PCR measures the intensity of fluorescence after a specific amplification cycle to identify a relative amount of a nucleic acid (gene) to be detected and quantifies the nucleic acid (gene) through comparison between a quantified standard material and result values. The advantages of this digital PCR enable absolute quantification of the sample itself by amplifying the nucleic acid to be detected and have good reproducibility and high sensitivity.

However, in the digital PCR, conventional technologies such as DNA solution division technology through oil emulsions are recognized to have limitations of high required costs generated in a process of packaging products and a long detection time required in the division technology, etc. Therefore, the development for overcoming these limitations of the digital PCR is continuing.

Meanwhile, in the PCR, three steps of denaturation, annealing, and elongation are performed as one cycle, and it is very important to rapidly increase and decrease a temperature in accordance with a temperature suitable for each step for reducing the PCR reaction time. However, since existing PCR devices use electric energy as a thermal energy source, it takes a long time of 1 hour or more to complete a nucleic acid amplification reaction, and components such as a heating device, a heat sink, etc. are required. As a result, there was a problem in that it was inconvenient that the equipment takes a lot of volume, and thus, there was some inconvenience to apply the existing PCR devices to fields requiring the rapid diagnosis of diseases.

In Korean Patent Publication No. 2009-0021957, there is disclosed a chip for micro polymerase chain reaction which is able to be easily manufactured and mass-produced by separately manufacturing a micro reactor chip and a micro heater chip to be used for micro polymerase chain reaction to semi-permanently use the micro heater chip. However, there is a limit to take a long detection time compared to light energy-based PCR in that a current is applied to a gold thin film to generate heat. In addition, in Korean Patent Publication No. 2017-0106995, there is disclosed a light energy-based PCR, but since the PCR reaction is performed in a liquid phase, there are problems that multiple diagnosis in one chamber is impossible, and the recovery of primers used is impossible.

Particularly, the existing PCR devices have limits to a high price, enlargement of equipment, uncomfortable carrying due to a long detection time (1 hour or more), and immediate diagnosis on the field, and thus, to solve the problems, studies for PCR have been steadily conducted.

PRIOR ART DOCUMENTS (Patent Document 1) Korean Laid-open Patent Publication No. 2009-0021957
(Patent Document 2) Korean Laid-open Patent Publication No. 2017-0106995

DISCLOSURE

Technical Problem

The present invention is derived to solve the problems above, and an object of the present invention is to provide a light-digital PCR chamber and a light-digital PCR device with optimized PCR performance by preventing a quenching phenomenon of a PCR fluorescent material while enabling PCR analysis very fast and with high sensitivity only with a small amount of sample in light-digital PCR using thermal energy generated by irradiating light energy.

Technical Solution

The present invention provides a light-digital PCR chamber comprising: a transparent substrate; a metal thin film layer formed on the transparent substrate; a light shielding layer formed on the metal thin film layer; and a microchannel structure formed on the light shielding layer.

Further, the present invention provides a light-digital PCR device comprising a laminate including a transparent substrate, a metal thin film layer formed on the transparent substrate, and a light shielding layer formed on the metal thin film layer.

Advantageous Effects

In the case of using the light-digital PCR chamber of the present invention, since the PCR reaction is performed by heat generated rapidly by light in the metal thin film layer, it is possible to shorten much more time than the existing PCR reaction by adjusting a temperature change more quickly than the related art (light energy-based PCR). In addition, when the metal thin film layer is micro-patterned, a vortex phenomenon is caused due to the temperature difference to perform more quickly the above temperature adjustment. Accordingly, the PCR reaction time may be further reduced.

Furthermore, the light irradiated to the metal thin film layer does not reach the microchannel structure by introducing the light shielding layer on the metal thin film layer formed to apply the light energy-based PCR to prevent reduction of performance of the light-digital PCR according to a quenching phenomenon of the PCR fluorescent material used in the light-digital PCR process. Therefore, since the PCR fluorescent material is not quenched even if the light energy-based PCR is applied as above, it is possible to quickly and sensitively perform quantitative analysis only with a much small amount of sample compared to the conventional digital PCR.

BEST MODE

Figure 1:
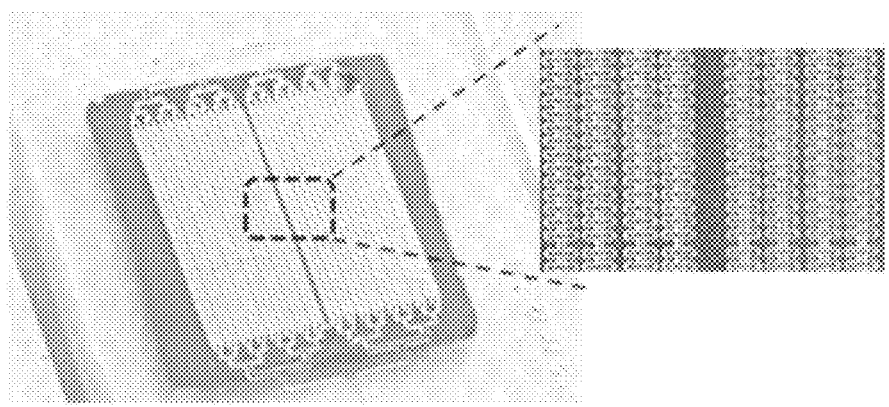
FIG. 1 is a diagram illustrating a laminate comprising a glass substrate/metal thin film layer/microchannel structure included in a light-digital PCR chamber of the present invention.
Figure 2:
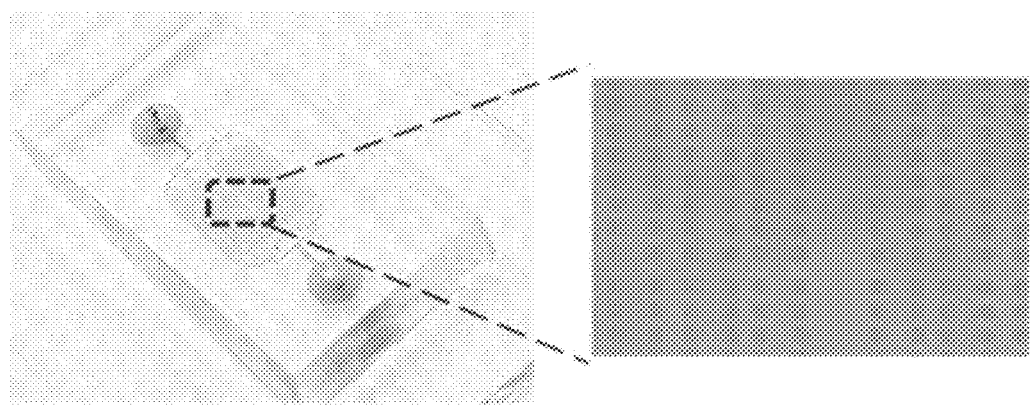
FIG. 2 is a diagram illustrating a microchannel structure included in the light-digital PCR chamber of the present invention.

Hereinafter, the present invention will be described in detail.

Polymerase chain reaction (PCR) is a technique for amplifying a specific region of a gene (DNA or RNA) to be detected in a large amount in vitro, and a first step of the PCR is a step of denaturing DNA (or RNA). Double-stranded DNA may be separated from each other by heating, and each separated DNA serves as a template. A denaturation temperature is generally 90° C. to 96° C., but varies depending on an amount of bases G+C in DNA and a length of DNA. A second step of the PCR is an annealing step. In this step, two types of primers bind to complementary template DNA, respectively. The binding temperature is an important factor for determining the accuracy of the reaction, and if the temperature is too high, the primer very weakly binds to the template DNA, and a product of the amplified DNA is very small. If the temperature is too low, the primer non-specifically binds to the template DNA, and thus, undesired DNA may be amplified. The general binding temperature is 50° C. to 65° C. A third step of the PCR is an elongation step. In this step, a heat-resistant DNA polymerase produces new DNA from the template DNA. At this time, the elongation temperature is 70° C. to 75° C. As described above, the PCR reaction has a series of three steps, and the three steps as a cycle are repeated with about 30 to 40 cycles to perform the PCR reaction.

In addition, the digital PCR (dPCR) is a form of employing reagents such as primers and PCR fluorescent materials (dye reagents) or enzymes used in existing PCR, and enables accurate quantitative analysis and high-sensitive detection of nucleic acid (DNA or RNA) to be detected as compared with the existing PCR. A result analysis method of the existing PCR is an analogue method, while the digital PCR which is a digital analysis method having a result signal value of "0" or "1" has an advantage of performing analysis of a large amount of sample, inspection of various samples at once, and various types of inspection items at once. The digital PCR technology is a technology of enabling absolute quantification of a DNA sample by applying a single molecular counting method without requiring a standard curve, and has an advantage of performing more accurate absolute quantification by the PCR reaction for one droplet per one well. Therefore, even if only a sample of about 10 to 1,000 pico liters is loaded compared to existing PCR or real-time PCR (qPCR), the PCR reaction is performed to identify a gene of the sample to be detected. In addition, conventional general PCR perform one reaction per well (sample), while the digital PCR has an advantage of analyzing/identifying various types of nucleic acids (genes) by performing a single reaction in a sample included in each partition when one sample is divided into a large number of partitions. Further, in the case of the conventional general PCR, the result is necessarily developed on an agarose gel and then needs to be observed through fluorescent imaging, and quantitative analysis itself is impossible. However, in the case of the digital PCR, a PCR analysis result can be identified immediately through a fluorescence analysis program, and furthermore, there is an advantage of enabling the quantitative analysis.

On the other hand, photonic PCR is PCR using plasmon photothermal conversion by the interaction between photons, electrons, and phonons on the surface of the metal thin film layer. Specifically, when the photons reach the surface of the metal thin film layer from an excited energy source, light absorption occurs, and the electrons are excited to a higher state near the surface thereof to form hot electrons. As these hot electrons are rapidly dispersed throughout the metal thin film layer and uniformly distributed, it is possible to heat a peripheral solution due to the hot metal surface. In addition, the hot electrons may be re-cooled by energy exchange with lattice phonons. As described above, the plasmon-excited metal thin film layer is heated to the maximum of 500° C. and a PCR sample solution around the metal thin film layer may be heated within a fast time to 150° C. or higher, so that there is an advantage that the PCR reaction may be performed very quickly.

The present invention has the advantages of both the digital PCR and the photonic PCR, and provides a technology capable of performing digital PCR based on plasmon photothermal conversion, like photonic PCR. In the present invention, the technology refers to a light-digital PCR technology.

1. Light-Digital PCR Chamber

The present invention provides a chamber used in light-digital PCR.

The light-digital PCR chamber of the present invention includes a transparent substrate; a metal thin film layer formed on the transparent substrate; a light shielding layer formed on the metal thin film layer; and a microchannel structure formed on the light shielding layer.

The transparent substrate may be prepared so as to transfer the light irradiated from one or more light sources located below an opposite side where the metal thin film layer is formed to the metal thin film layer without loss, and has excellent adhesion to the metal thin film layer.

The light source is not limited thereto as long as the light source may generate visible light or infrared light, and may use a halogen lamp, an LED lamp, a fluorescent lamp, an incandescent lamp, an arc source lamp, an infrared lamp, an HMI lamp, etc., preferably an LED lamp in terms of power efficiency or economics.

The transparent substrate may be made of a transparent material so as to transmit irradiated light, and may be made of a material that is almost not deformed by light or heat. Preferably, the transparent substrate may be a glass substrate, a plastic substrate (polyester substrate, polyacryl substrate, etc.), a silicon substrate, or the like, but is not limited thereto.

The transparent substrate has a predetermined thickness, and the thickness of the transparent substrate may be 0.1 mm to 10 mm, preferably 0.3 mm to 5 mm, more preferably 0.3 mm to 1.5 mm. When the thickness of the transparent substrate satisfies the above range, thermal energy by light energy irradiated from the light source is efficiently transmitted to optimize a light-digital PCR reaction cycle.

The light-digital PCR chamber may use the metal thin film layer to use thermal energy by light energy irradiation. Since a temperature may instantly rise to the maximum of 500° C. or higher, a metal thin film provided in the metal thin film layer may rapidly perform a temperature change in a temperature range (about 50° C. to 95° C.) of the PCR cycle.

In particular, in PCR using secondary thermal energy generated by applying a voltage, which is existing Peltier-based primary energy, a repeated time (2 to 3° C. per second) of heating (Max. 95° C.)/cooling (60° C.) is relatively increased. However, like the present invention, in the case of using the metal thin film layer which converts the light energy to the thermal energy, the temperature change may be performed at a rate of 4 to 5° C. per second to identify the light-digital PCR result within a very short time of about 10 to 11 minutes based on 40 PCR cycles (repeating of heating/cooling).

The metal of the metal thin film layer may be any one selected from the group consisting of copper (Cu), silver (Ag), gold (Au), palladium (Pd), platinum (Pt), rhodium (Rh), and combinations thereof (e.g., bimetallic nanoparticles). Preferably, the metal may be gold (Au) having excellent stability and fast light absorption.

A method of coating the metal thin film layer on one side of the transparent substrate is not limited thereto so long as the method is a coating or deposition technology. The metal thin film layer may be formed on the transparent substrate with a regular thickness by a method, such as chemical vapor deposition (CVD), physical vapor deposition (PVD), thermal evaporation deposition, sputtering deposition, or atomic layer deposition (ALD).

A thickness of the metal thin film layer may be 10 nm to 200 nm. If the thickness of the metal thin film layer exceeds the above range, there is a problem in performing the temperature change according to the thermal energy conversion by light energy.

In addition, the metal thin film layer may be micro-patterned. When the metal thin film layer is micro-patterned, the temperature of the micro-patterned portion rapidly rises, but the temperature between non-patterned patterns is relatively lowered, so that a vortex phenomenon occurs due to a temperature difference.

Figure 15:
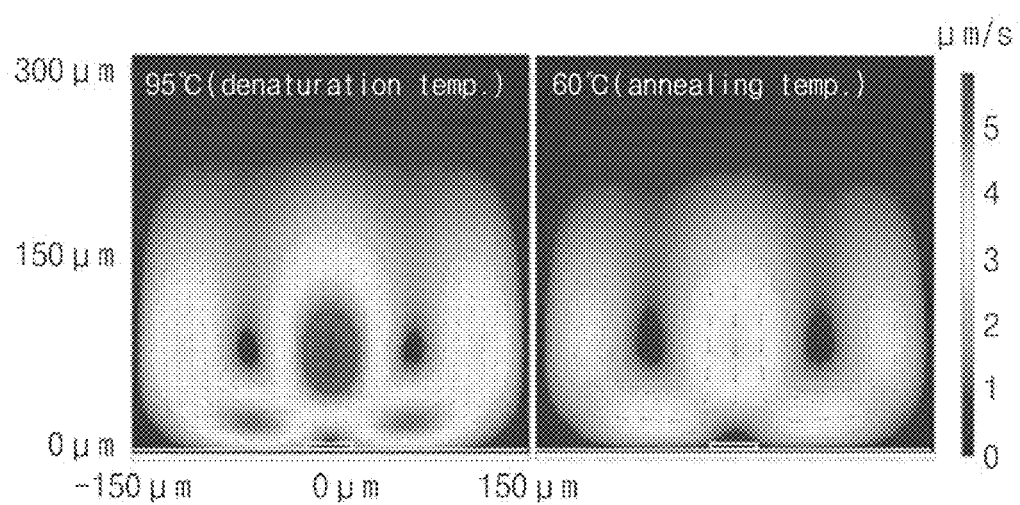
FIG. 15 is a diagram illustrating a vortex phenomenon according to heat transfer on the surface of the micro-patterned gold thin film of the present invention.
Figure 16:
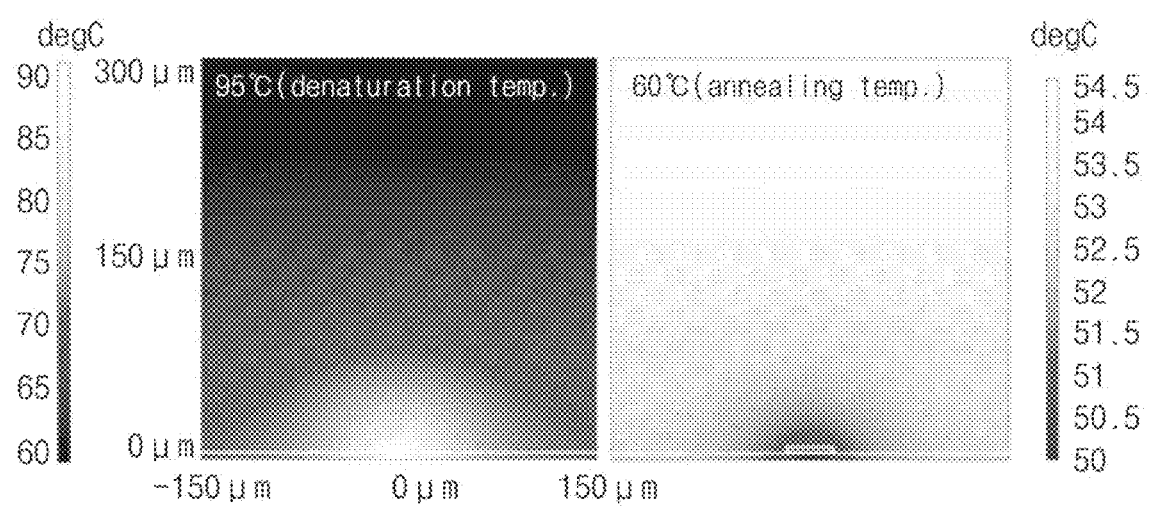
FIG. 16 is a diagram illustrating a temperature distribution on the surface of the micro-patterned gold thin film of the present invention.

In other words, when the metal thin film layer is micro-patterned as described above, a portion where thermal energy is generated by the light irradiated during the light-digital PCR reaction is limited to the metal thin film pattern, and the thermal energy is not generated between the metal thin film patterns. Accordingly, like FIGS. 15 and 16, the temperature difference between the metal thin film patterns is generated, and as a result, the vortex phenomenon occurs. At this time, according to an interval between the micropatterns, and the size and shape of the pattern, the degree of the vortex phenomenon according to heat transfer is determined.

The micropattern may be a circle or a polygon such as a triangle, a rectangular, a pentagon, a hexagon, and the like. The size of the micropattern may have an average diameter or a radius of a circumcircle of 1 μm to 20 μm. For example, a diameter when the micropattern is a circle or a radius of a circumcircle when the micropattern is a polygon may be 1 μm to 20 μm. An average interval between the micropatterns may be 3 μm to 5 μm.

The method for micro-patterning the metal thin film layer is not limited thereto as long as the method is a patterning technology, and the metal thin film layer may be micro-patterned by a method, such as double exposure lithography, nano imprint lithography (NIL), electron beam lithography (EBL), focused ion beam (FIB), soft lithography (SL), self-assembly of block copolymers, or the like.

Preferably, the patterning by the double exposure lithography method, not an existing single exposure lithography method, enables clear micro-patterning in a pattern form having more regular intervals.

The light shielding layer is formed on the metal thin film layer to prevent a quenching phenomenon of the PCR fluorescent material included in the sample during the light-digital PCR reaction.

In particular, the PCR fluorescent material used to identify the PCR result naturally binds to a DNA double bond, and these PCR fluorescent materials are added after 40 PCR reaction cycles in the light energy-based PCR to be used when the result is identified, and thus, the quenching phenomenon may not occur by the light of the PCR fluorescent material. However, in the digital PCR, the PCR fluorescent material is included together in the sample in early PCR reaction, so that the quenching phenomenon may occur in the PCR fluorescent material after 40 PCR reaction cycles.

The light shielding layer is formed between the metal thin film layer and the microchannel structure in the light-digital PCR chamber of the present invention, so that the light irradiated from the light source does not reach the microchannel structure to bring an effect of preventing the reduction in performance of the light-digital PCR of the present invention. As a result, as compared with the case of including only the metal thin film layer, it was confirmed that a limit detection capacity increased by about 10 times or more, and it is possible to improve the performance of 10 times or more only with a very small amount (about 2 pg/µl) of sample by applying such a light shielding layer.

The light shielding layer may be a polydopamine film, a photocatalyst organic compound film or a dabcyl organic compound film.

The photocatalyst organic compound may include at least one selected from the Melem and graphitic carbon nitride (g-$C_3N_4$).

A thickness of the light shielding layer may be 1 nm to 1 µm. When the thickness of the light shielding layer is less than 1 nm, the light introduced to the microchannel structure is not efficiently shielded so that the quenching of the PCR fluorescent material may occur. When the thickness of the light shielding layer is more than 1 µm, the thermal energy converted from the light energy in the metal thin film layer may reduce the temperature change of the PCR sample in the fine flow structure.

A thickness of a dabcyl layer formed by binding of the dabcyl and the carbene is less than 10 nm, and the concentration may be 10 µM to 3 mM. When the concentration of the dabcyl satisfies the above range, it is possible to prevent the quenching phenomenon of the PCR fluorescent material by efficiently shielding the light introduced to the microchannel structure.

As a linker for immobilizing the dabcyl on the surface of the micro-patterned metal thin film, an N-heterocyclic carbene compound may be used. The N-heterocyclic carbene compound may be introduced on the surface of the micro-patterned metal thin film through a metal-carbene bond.

In particular, a linker having a thiol (—SH) group used in solid-phase PCR has a problem that the reproducibility of the PCR reaction result is lowered due to the instability (breakage of a metal-sulfur bond) in a high temperature (70° C. or higher) of the metal-sulfur bond. In contrast, when as the linker for immobilizing the dabcyl on the micro-patterned metal thin film, the N-heterocyclic carbene compound is used, even if a surface temperature of the micro-patterned metal thin film temporarily rises to the maximum of 500° C. by the light source, stability may be obtained at a high temperature due to the metal-carbene bond, and thus, there is an advantage of being able to be applied even to PCR devices using light energy.

The N-heterocyclic carbene compound may be represented by the following Chemical Formula 1 or 2.

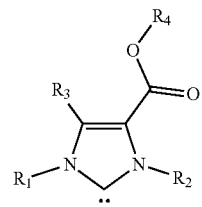

[Chemical Formula 1]

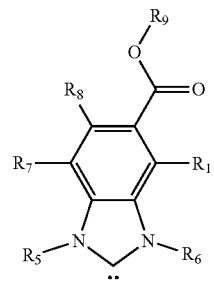

[Chemical Formula 2]

In Chemical Formulas 1 and 2 above, $R_1$, $R_2$, $R_5$ and $R_6$ are equal to or different from each other, and each independently hydrogen, an alkyl group having 1 to 20 carbon atoms, a cycloalkyl group having 3 to 20 carbon atoms, an aryl group having 6 to 30 carbon atoms, or a heteroaryl group having 2 to 30 carbon atoms, $R_4$ and $R_9$ are equal to or different from each other, and each independently hydrogen, or an alkyl group having 1 to 20 carbon atoms, $R_3$, $R_7$, $R_8$ and $R_{10}$ are equal to or different from each other, and each independently hydrogen, an alkyl group having 1 to 20 carbon atoms, a cycloalkyl group having 3 to 20 carbon atoms, an aryl group having 6 to 30 carbon atoms, or a heteroaryl group having 2 to 30 carbon atoms, or $R_7$ and $R_8$ bind to each other to form a hydrocarbon ring.

In the present invention, the "adjacent" group may mean a substituent substituted to an atom linked directly to an atom substituted with the corresponding substituent, a substituent that is located stereoscopically closest to the corresponding substituent, or another substitutent substituted to an atom substituted with the corresponding substituent. For example, it will be interpreted that two substituents substituted in ortho sites in a benzene ring and two substituents substituted to the same carbon in an aliphatic ring are groups "adjacent" to each other.

The alkyl group may be a linear or branched chain, and may have 1 to 20 carbon atoms, preferably 1 to 10 carbon atoms. More preferably, the alkyl group may have 1 to 6 carbon atoms. Specific examples of the alkyl group include methyl, ethyl, propyl, n-propyl, isopropyl, butyl, n-butyl, isobutyl, tert-butyl, sec-butyl, 1-methylbutyl, 1-ethylbutyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylobutyl, 2-ethylbutyl, heptyl, n-heptyl, 1-methylhexyl, cyclopentyl methyl, cyclohexylmethyl, octyl, n-octyl, tert-octyl, 1-methylheptyl, 2-ethylhexyl, 2-propyl pentyl, n-nonyl, 2,2-dimethylheptyl, 1-ethyl propyl, 1,1-dimethyl propyl, isohexyl, 4-methylhexyl, 5-methylhexyl, benzyl, etc., but are not limited thereto.

The cycloalkyl group may have 3 to 20 carbon atoms, preferably 3 to 10 carbon atoms. Specific examples of the cycloalkyl group include cyclopropyl, cyclobutyl, cyclopentyl, 3-methylcycropentyl, 2,3-dimethylcyclopentyl, cyclohexyl, 3-methylcyclohexyl, 4-methylcyclohexyl, 2,3-dimethylcyclohexyl, 3,4,5-trimethylcyclohexyl, 4-tert-butylcyclohexyl, cycloheptyl, cyclooctyl, etc., but are not limited thereto.

The aryl group may have 6 to 30 carbon atoms, preferably 6 to 10 carbon atoms. The aryl group may be a monocyclic aryl group or a polycyclic aryl group. Specific examples of the monocyclic aryl group include a phenyl group, a biphphenyl group, a terphenyl group, etc., and the specific examples of the polycyclic aryl group include a naphthyl group, an anthracenyl group, a phenanthyl group, a pyrenyl group, a perylenyl group, a chrysenyl group, a fluorenyl group, a triphenylene group, etc., but are not limited thereto.

The heteroaryl group may be an aromatic ring group including one or more selected from N, O, P, S, Si and Se as a heteroatom, and may have 2 to 30 carbon atoms, preferably 2 to 20 carbon atoms. Specific examples of the heteroaryl group include a thiophene group, a furan group, a pyrrole group, an imidazole group, a thiazole group, an oxazole group, an oxadiazole group, a triazole group, a pyridyl group, a pyrimidyl group, a triazine group, a triazole group, an acryldyl group, a quinolinyl group, a quinazoline group, a quinoxalinyl group, a phtalazyrinyl group, an isoquinoline group, an indole group, a carbazole group, a benzoxazole group, a benzimidazole group, a benzothiazole group, a benzocarbazole group, a benzothiophene group, a dibenzothiophene group, a benzofuranyl group, etc., but are not limited thereto.

The hydrocarbon ring may be an aliphatic ring or an aromatic ring, and the aliphatic ring may include the above-mentioned cycloalkyl group, and the aromatic ring may include the above-mentioned aryl group or heteroaryl group.

In addition, the alkyl group, the cycloalkyl group, the aryl group, the heteroaryl group, or the hydrocarbon ring may be substituted or unsubstituted with an alkyl group, a cycloalkyl group, an aryl group or a heteroaryl group again.

On the surface of the micro-patterned metal thin film, a terminal of the N-heterocyclic carbene compound may be bound, and at this time, a metal-carbene bond may be formed by a method, such as chemical vapor deposition (CVD), physical vapor deposition (PVD), thermal evaporation deposition, sputtering deposition, atomic layer deposition (ALD), chemical-bath deposition (CBD), or the like.

The terminal of the N-heterocyclic carbene compound may be functionalized with a carboxyl group.

The terminal of the N-heterocyclic carbene compound is functionalized by using various amines to form an amine layer.

The amine may include diamine, triamine, tetraamine, pentaamine, hexaamine, or mixtures thereof. Specifically, the amine may be methylenediamine, ethylenediamine, propylenediamine, butylenediamine, hexamethyldiamine, aminoethylethanolamine, phenylenediamine, dimethylenetriamine, diethylenetriamine, triethylenetetraamine (TETA), tetraethylenepentaamine (TEPA), pentaethylenehexaamine (PEHA), hexamethylenediamine (HMDA), etc., but is not limited thereto.

The amine may be polyethyleneimine, wherein the weight average molecular weight may be 1,000 to 1,000,000 g/mol.

The dabcyl may be bound and immobilized on the amine layer of the N-heterocyclic carbene compound.

Figure 7:
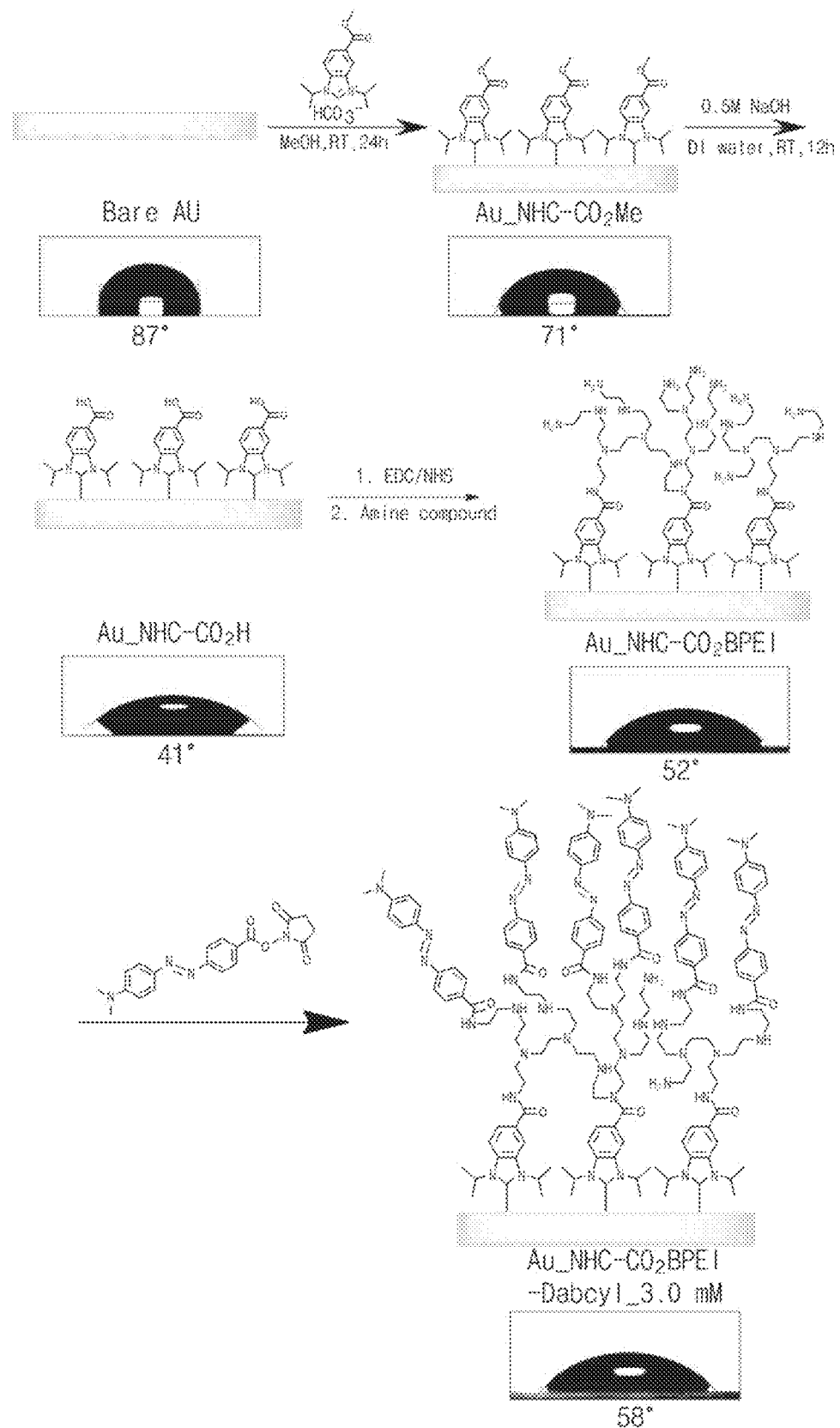
FIG. 7 is a diagram illustrating a schematic diagram of surface treatment of dabcyl/carbene of a micro-patterned gold thin film and a contact angle analysis result according to Experimental Example 3.

When the other terminal of the N-heterocyclic carbene compound is functionalized with the carboxyl group, as illustrated in FIG. 7, the surface treatment is performed by amine to substitute the function group from the carboxyl group to amine and the dabcyl may be immobilized on the amine layer formed as such. Accordingly, as compared with a case where the dabcyl is generally bound with the micro-patterned metal thin film by electrostatic attraction, the dabcyl may be immobilized to the micro-patterned metal thin film by a stronger chemical bond, and thus, there is an effect of improving excellent stability, storability, and ease of storage in the case of being used for a solid-phase PCR reaction.

The microchannel structure may be formed on the light shielding layer to maximize the efficiency of the light-digital PCR reaction of the present invention.

Particularly, the microchannel structure may have one or more microchannel sets independently formed. The microchannel set includes one or more sample injection portions and one or more sample extraction portions, and a plurality of microchannels connecting the sample injection portions and the sample extraction portions may be formed. In addition, the microchannel may include one stem channel and a plurality of branch channels connected to the stem channel. Due to such a shape, the number of holes (wells) in which the light-digital PCR reaction occurs may be maximized, and the sample to be detected is smoothly distributed, and the PCR reaction may be performed within the plurality of holes (wells) present in the microchannel structure.

Further, since one or more microchannel sets are independently formed, the sample to be detected is independently injected to the one or more sample injection portions included in each microchannel set to perform multiple light-digital PCR reaction at the same time.

A material of the microchannel structure is a transparent material or a thermally conductive material, but is not limited thereto, and specifically, the material may be a polymeric material capable of forming, such as polydimethylsiloxane (PDMS).

The microchannel of the microchannel structure is a groove having a microchannel cross section with a rounded bottom, a transparent film may be attached to an upper portion thereof, and the size of the microchannel cross section may have a width of 5 μm to 100 μm and a height of 5 μm to 100 μm.

Specifically, a series of processes and effects of the light-digital PCR reaction using the light-digital PCR chamber of the present invention will be described below.

The light-digital PCR chamber may be positioned adjacent (near) to the light source. As long as the light energy generated from the light source may reach the metal thin film layer, the position of the light source is not limited thereto. However, in an embodiment of the present invention, when the light-digital PCR chamber is a laminated structure such as a transparent substrate/metal thin film layer/light shielding layer/microchannel structure, the light source may be positioned on a lower portion of the transparent substrate (an opposite side of the surface on which the metal thin film layer of the transparent substrate is positioned).

For example, when the light source is disposed on the lower portion of the transparent substrate of the light-digital PCR chamber of the present invention, the light energy emitted from the light source positioned at the lower portion of the transparent substrate passes through the transparent substrate to reach the metal thin film layer. The light energy reaching the metal thin film layer is converted to thermal energy while plasmon photothermal conversion occurs in the metal thin film layer. In this case, the temperature of the metal thin film layer rises up to the maximum of 500° C. and such thermal energy causes a temperature change of the PCR sample present in the microchannel structure to perform repetitively a cycle of denaturation, annealing, and elongation steps, thereby amplifying DNA (or RNA). Such amplified DNA (or RNA) may be analyzed by detecting fluorescence of the PCR fluorescent material in the PCR sample. The metal thin film layer may use a gold thin film for more efficient photothermal conversion, and as the gold thin film is micro-patterned, a faster temperature change is enabled to shorten the light-digital PCR reaction time of the present invention.

In the microchannel structure, for the digital PCR, a droplet (PCR sample) including a gene (template) to be detected, a primer, Taq polymerase, dNTP, and a PCR fluorescent material, which is diluted at a copy number of average 0.5 to 1, is distributed in each well present in the microchannel structure. Then, after the PCR is performed according to the above temperature change, wells having a fluorescent signal count as a value of "1" and wells having no fluorescent signal count as a value of "0" to perform absolute quantification.

In particular, as the light-digital PCR chamber of the present invention uses the digital PCR, the PCR fluorescent material is included together in the PCR sample present in the microchannel structure. However, in order to prevent a quenching phenomenon of the PCR fluorescent material from occurring by the light from the light source, the light shielding layer is included between the metal thin film layer and the microchannel structure. Accordingly, the light to the PCR fluorescent material present in the microchannel structure is shielded to enable very fast and high-sensitive light-digital PCR reaction.

As described above, since the light-digital PCR chamber of the present invention is provided in any PCR device having the light source, the photonic PCR and the digital PCR are used at the same time, thereby enabling accurate and quantitative PCR analysis within a very fast time.

2. Light-Digital PCR Device

The present invention provides a light-digital PCR device comprising a laminate including a transparent substrate, a metal thin film layer formed on the transparent substrate, and a light shielding layer formed on the metal thin film layer.

The transparent substrate, the metal thin film layer, and the light shielding layer, which configure the laminate included in the light-digital PCR device, may be applied in the same manner as the contents defined in the aforementioned light-digital PCR chamber.

The light-digital PCR device including the laminate may further include a light source. The light source is not limited thereto as long as the light source may generate visible light or infrared light, and may use a halogen lamp, an LED lamp, a fluorescent lamp, an incandescent lamp, an arc source lamp, an infrared lamp, an HMI lamp, etc., preferably a LED lamp in terms of power efficiency or economics.

The position of the light source in the light-digital PCR device is not limited thereto as long as the light energy may reach the metal thin film layer of the laminate. However, preferably, the light source is positioned on the lower portion of the transparent substrate of the laminate (transparent substrate/metal thin film layer/light shielding layer) (an opposite side of the surface where the metal thin film layer of the transparent substrate is positioned) to most efficiently transmitting the thermal energy.

Specifically, a series of processes and effects of the light-digital PCR reaction using the light-digital PCR device of the present invention will be described below.

First, for the digital PCR, a droplet (PCR sample) including a gene (template) to be detected, a primer, Taq polymerase, dNTP, and a PCR fluorescent material is prepared and distributed in each well present in the microchannel structure. Then, the prepared microchannel structure is disposed on the laminate present in the light-digital PCR device.

Thereafter, when the light energy generated from the light source of the light-digital PCR device reaches the metal thin film layer of the laminate, the light energy reaching the metal thin film layer is converted to thermal energy while the plasmon photothermal conversion occurs in the metal thin film layer. In this case, the temperature of the metal thin film layer rises up to the maximum of 500° C. and such thermal energy causes a temperature change (about 50° C. to 95° C.) of the PCR sample present in the microchannel structure disposed on the laminated of the light-digital PCR device to perform repetitively a cycle of denaturation, annealing, and elongation steps in the sample distributed in each well of the microchannel structure, thereby amplifying DNA (or RNA). At this time, after the PCR is performed, wells having a fluorescent signal count as a value of "1" and wells having no fluorescent signal count as a value of "0" to perform absolute quantification. The metal thin film layer may use a gold thin film for more efficient photothermal conversion, and as the gold thin film is micro-patterned, a faster temperature change is enabled to shorten the light-digital PCR reaction time of the present invention.

In particular, as the light-digital PCR device of the present invention uses the digital PCR, the PCR fluorescent material is included together in the PCR sample present in the microchannel structure. However, in order to prevent a quenching phenomenon of the PCR fluorescent material from occurring by the light from the light source, a light shielding layer of a polydopamine film, a photocatalyst organic compound film or a dabcyl organic compound film is included between the metal thin film layer and the microchannel structure. Accordingly, the light to the PCR fluorescent material present in the microchannel structure is shielded to enable fast and high-sensitive light-digital PCR reaction and analysis with a very small amount of reagent.

As described above, when the light-digital PCR device of the present invention performs the light-digital PCR reaction, a microchannel structure including various types of PCR reagents may also be used. In one microchannel structure, a plurality of wells is included so that droplets including various types of genes to be detected, primers, and PCR fluorescent materials may be distributed to enable analysis of multiple PCR reactions at once. The photonic PCR and the digital PCR are used at the same time to enable accurate and quantitative PCR analysis within a very fast time.

Hereinafter, the present invention will be described in more detail with reference to preferred Examples.

However, these Examples are to describe the present invention in more detail, and the scope of the present invention is not limited thereto.

Preparation Examples

Preparation Example 1 cDNA of a lung cancer cell line A549 was used as a template DNA, and a liquid PCR reactant A including dNTP, Taq polymerase, the following reverse primer and forward primer, and a PCR fluorescent material SYBR Green was prepared.

Preparation Example 2 cDNA of a lung cancer cell line A549 was used as a template DNA, and a liquid PCR reactant B including dNTP, Taq polymerase, the following reverse primer and forward primer, and a PCR fluorescent material Fluorescein was prepared.

[Primers in Liquid PCR Reactant]

Forward primer: 5'-GACCCAATCATGAGCACTG-3'
Reverse primer: 5'-TGAAGCGACCCTCTGATG-3'

Preparation Example 3

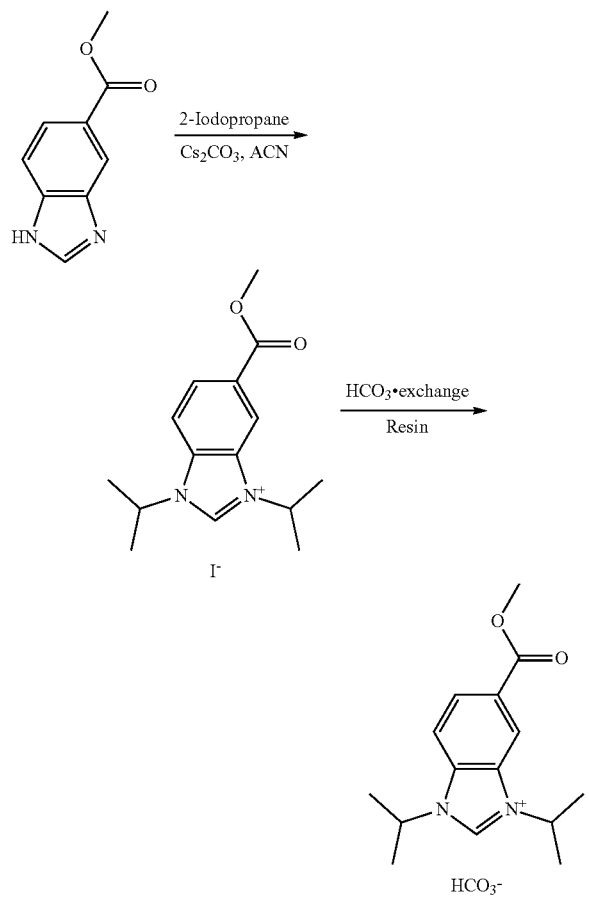

EXAMPLES

Example 1

A micro-patterned gold thin film was formed on a glass substrate (0.5 mm) at a thickness of 160 nm by a chemical vapor deposition method, a polydopamine film was formed on the gold thin film, and then a microchannel structure was disposed thereon to form a laminate, and thereafter, a light-digital PCR chamber including the PCR reactant A prepared in Preparation Example 1 was prepared.

Example 2

Except for forming a photocatalyst 1 organic compound (Melem) film as the light shielding layer instead of the polydopamine film in Example 1, a light-digital PCR chamber was prepared in the same manner as Example 1 above.

Example 3

Except for forming a photocatalyst 2 organic compound (g-$C_3N_4$) film as the light shielding layer instead of the polydopamine film in Example 1, a light-digital PCR chamber was prepared in the same manner as Example 1 above.

Example 4

Except for forming a dabcyl organic compound film as the light shielding layer instead of the polydopamine film in Example 1, a light-digital PCR chamber was prepared in the same manner as Example 1 above.

Example 5

Except for using the PCR reactant B prepared in Preparation Example 2 instead of the PCR reactant A prepared in Preparation Example 1 in Example 1, a light-digital PCR chamber was prepared in the same manner as Example 1 above.

Example 6

Except for using the PCR reactant B prepared in Preparation Example 2 instead of the PCR reactant A prepared in Preparation Example 1 in Example 2, a light-digital PCR chamber was prepared in the same manner as Example 2 above.

Example 7

Except for using the PCR reactant B prepared in Preparation Example 2 instead of the PCR reactant A prepared in Preparation Example 1 in Example 3, a light-digital PCR chamber was prepared in the same manner as Example 3 above.

Example 8

Except for using the PCR reactant B prepared in Preparation Example 2 instead of the PCR reactant A prepared in Preparation Example 1 in Example 4, a light-digital PCR chamber was prepared in the same manner as Example 4 above.

Comparative Example 1

A micro-patterned gold thin film was formed on a glass substrate (0.5 mm) at a thickness of 160 nm by a chemical vapor deposition method, a microchannel structure was disposed on the gold thin film to form a laminate, and thereafter, a light-digital PCR chamber including the PCR reactant A prepared in Preparation Example 1 was prepared.

Comparative Example 2

Except for using the PCR reactant B prepared in Preparation Example 2 instead of the PCR reactant A prepared in Preparation Example 1 in Comparative Example 1, a light-digital PCR chamber was prepared in the same manner as Comparative Example 1 above.

Comparative Example 3

A non-micropatterned gold thin film was formed on a glass substrate (0.5 mm) at a thickness of 160 nm by a chemical vapor deposition method, a polydopamine film was formed on the gold thin film, and then a microchannel structure was disposed thereon to form a laminate, and thereafter, a light-digital PCR chamber including the PCR reactant A prepared in Preparation Example 1 was prepared.

Comparative Example 4

A micro-patterned gold thin film was formed on a glass substrate (0.5 mm) at a thickness of 160 nm by a chemical vapor deposition method to form a laminate, and thereafter, a light-digital PCR chamber including the PCR reactant A prepared in Preparation Example 1 was prepared.

Comparative Example 5

Except for using the PCR reactant B prepared in Preparation Example 2 instead of the PCR reactant A prepared in Preparation Example 1 in Comparative Example 4, a light-digital PCR chamber was prepared in the same manner as Comparative Example 4 above.

Experimental Example 1

Figure 3:
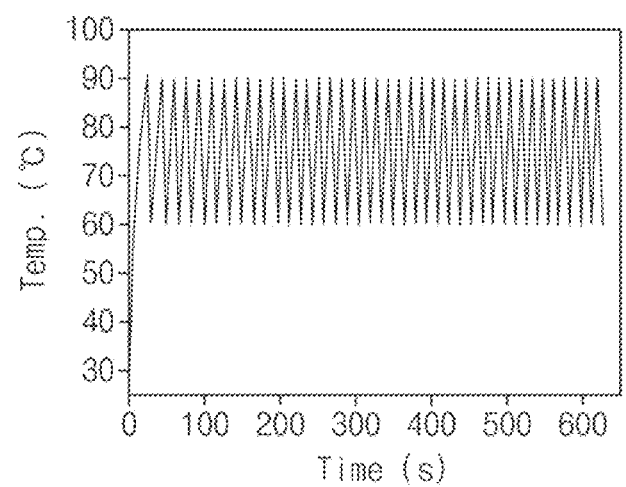
FIG. 3 is a diagram illustrating a time required for light-digital PCR reaction using a light-digital PCR chamber of Example 1 according to Experimental Example 1.
Figure 4:
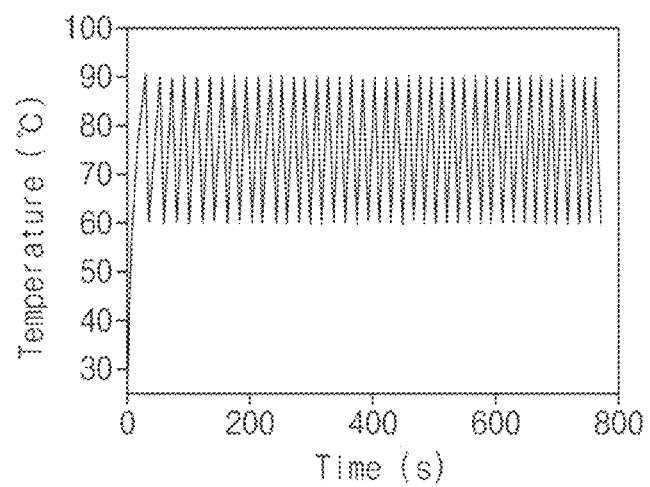
FIG. 4 is a diagram illustrating a time required for light-digital PCR reaction using a light-digital PCR chamber of Comparative Example 3 according to Experimental Example 1.

Evaluation of Light-Digital PCR Reaction Time According to Micro-Patterning of Gold Thin Film Times required for performing 40 light-digital PCR cycles were illustrated in FIGS. 3 and 4 by using the light-digital PCR chambers prepared in Example 1 and Comparative Example 3, respectively.

According to Example 1 and FIGS. 3 and 4, it was confirmed that in the case of Example 1 of micro-patterning the gold thin film, the time of 10 minutes was required to perform 40 cycles of light-digital PCR reaction, while in the case of Comparative Example 3 of non-micropatterning the gold thin film, the time of 12 minutes was required to perform 40 cycles of light-digital PCR reaction.

Experimental Example 2

Figure 5:
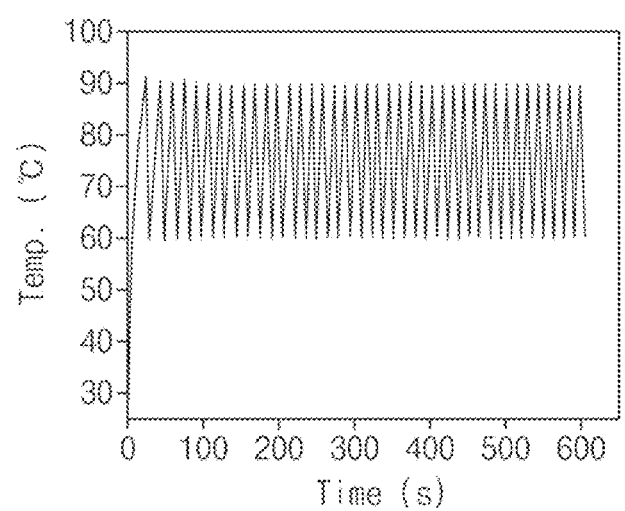
FIG. 5 is a diagram illustrating a time required for light-digital PCR reaction using a light-digital PCR chamber of Example 2 according to Experimental Example 2.
Figure 6:
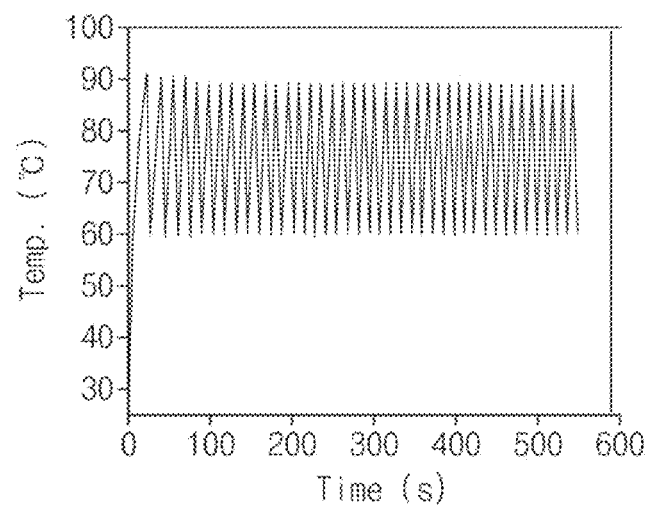
FIG. 6 is a diagram illustrating a time required for light-digital PCR reaction using a light-digital PCR chamber of Example 4 according to Experimental Example 2.

Evaluation of Light-Digital PCR Reaction Time According to Light Shielding Layer Times required for performing 40 light-digital PCR cycles were illustrated in FIGS. 5 and 6 by using the light-digital PCR chambers prepared in Examples 2 and 4, respectively.

According to Examples 2 and 4 and FIGS. 5 and 6, it was confirmed that in the case of Example 2 (FIG. 5) of forming the photocatalyst 1 organic compound (Melem) film on the micro-patterned gold thin film, the time of 10 minutes was required to perform 40 cycles of light-digital PCR reaction, while in the case of Example 4 (FIG. 6) of forming the dabcyl organic compound film instead of the photocatalyst 1 organic compound film as the light shielding layer, the time of 9 minutes was required to perform 40 cycles of light-digital PCR reaction.

Experimental Example 3

Figure 8:
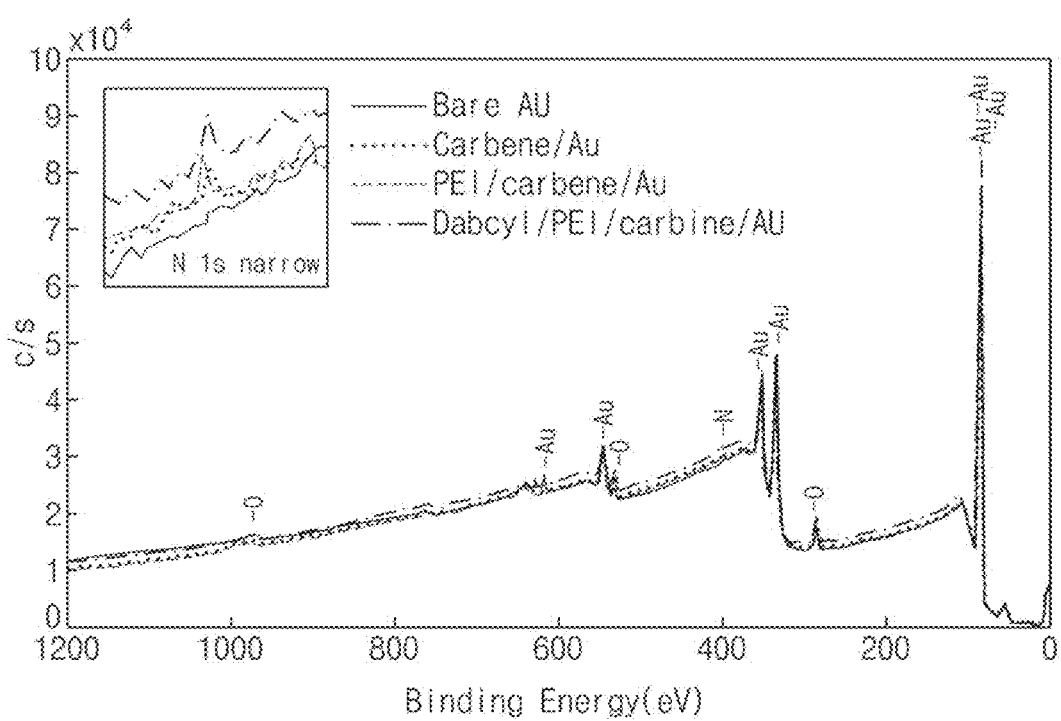
FIG. 8 is a diagram illustrating a photoelectron spectroscopy analysis result for surface treatment of dabcyl/carbene of a micro-patterned gold thin film according to Experimental Example 3.

Schematic Diagram of Surface Treatment with Carbene and Dabcyl on Micro-Patterned Gold Thin Film and Examination of Changes in Surface Properties A step-specific schematic diagram for immobilizing dabcyl in Examples 4 and 8 and measurement of contact angles and photoelectron spectroscopy were performed, and changes in surface properties according to surface treatment were confirmed according to FIGS. 7 and 8.

According to FIG. 8, after carbene was treated on a gold thin film (bare gold), peaks were generated in N 1s narrow, and as a result, it was confirmed that gold-carbene bonds were formed. In addition, in the case of the gold thin film immobilized with dabcyl, the increased peak intensity meant the surface treatment.

Experimental Example 4

Figure 9:
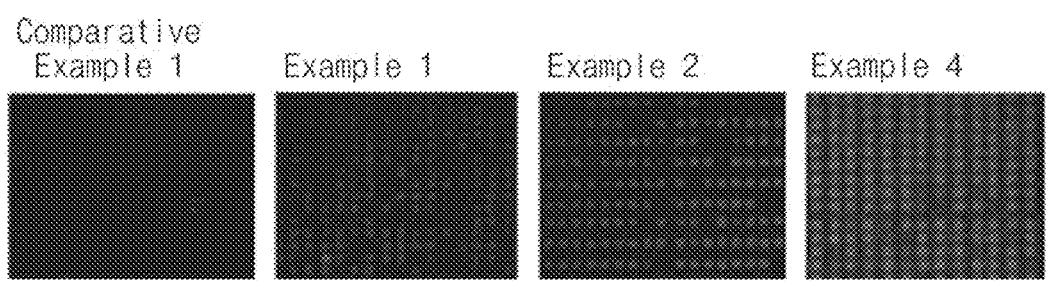
FIG. 9 is a diagram illustrating a result of performing fluorescence evaluation after light-digital PCR reaction according to Experimental Example 4-1.

1. Evaluation of Light-Digital PCR Reaction Fluorescence According to Light Shielding Layer After 40 light-digital PCR cycles were performed by using the light-digital PCR chambers prepared in Examples 1, 2, and 4 and Comparative Example 1, fluorescence results measured through a fluorescent microscope were illustrated in FIG. 9.

Figure 10:
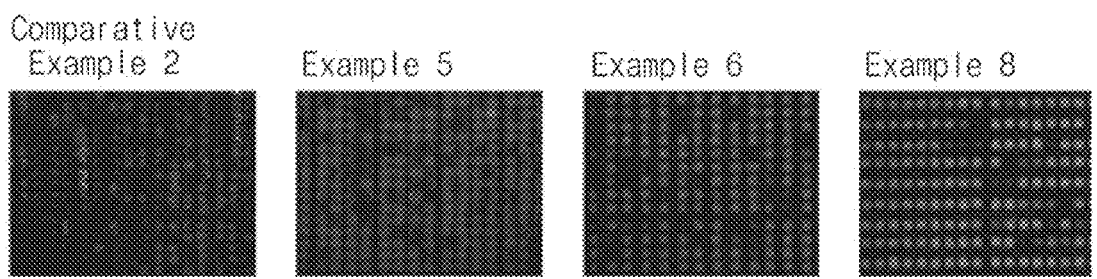
FIG. 10 is a diagram illustrating a result of performing fluorescence evaluation after light-digital PCR reaction according to Experimental Example 4-2.

2. Evaluation of Light-Digital PCR Reaction Fluorescence According to Light Shielding Layer After 40 light-digital PCR cycles were performed by using the light-digital PCR chambers prepared in Examples 5, 6, and 8 and Comparative Example 2, fluorescence results measured through a fluorescent microscope were illustrated in FIG. 10.

According to Experimental Example 2 above, in the case of Examples 1 and 5 of using the polydopamine film as the light shielding layer, Examples 2 and 6 of using the photocatalyst 1 organic compound (Melem) film as the light shielding layer, and Examples 4 and 8 of using the dabcyl organic compound film as the light shielding layer, it was confirmed that even after 40 cycles of light-digital PCR reaction were performed, the quenching phenomenon of the PCR fluorescent material was prevented to detect more accurately and precisely the PCR reaction result. However, in the case of Comparative Examples 1 and 2 without using the light shielding layer, it was confirmed that the quenching phenomenon of the PCR fluorescent material occurred.

Experimental Example 5

Figure 11:
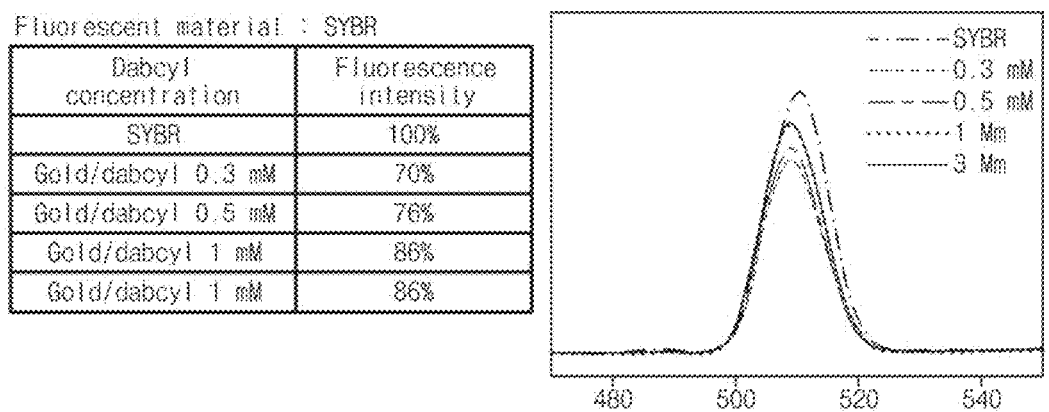
FIG. 11 is a diagram illustrating a result of performing fluorescence evaluation after light-digital PCR reaction of Example 4 according to Experimental Example 5.

Evaluation of quenching prevention effect after light-digital PCR reaction for PCR fluorescent material (SYBR Green) according to concentration of dabcyl organic compound in light shielding layer In Example 4, after 40 cycles of light-digital PCR reaction were performed while changing the concentrations of the dabcyl organic compound to 0 mM, 0.3 mM, 0.5 mM, 1 mM, and 3 mM, a result of measuring the fluorescent intensity of a PCR fluorescent material included in a sample was illustrated in FIG. 11.

According to Experimental Example 5 and FIG. 11, it can be seen that the effect of preventing the quenching phenomenon is improved as the dabcyl concentration increases.

Experimental Example 6

1. Evaluation of Quenching Prevention Effect after Light-Digital PCR Reaction for PCR Fluorescent Material (SYBR Green)

Figure 12:
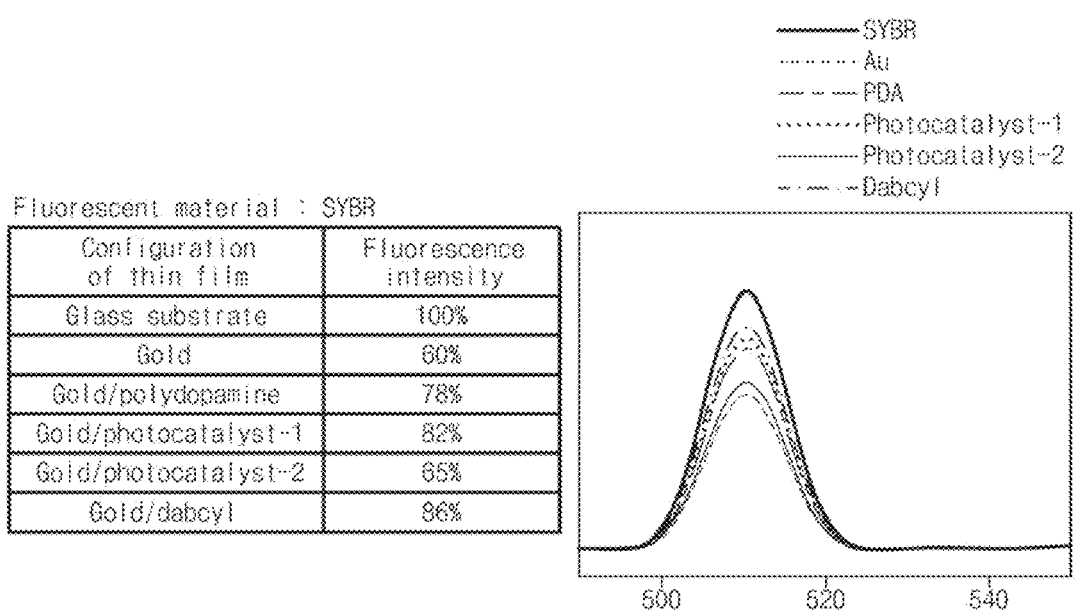
FIG. 12 is a diagram illustrating a result of evaluating a quenching prevention effect of a PCR fluorescent material after light-digital PCR reaction according to Experimental Example 6-1.

With respect to Examples 1, 2, 3, and 4 and Comparative Example 4, after 40 cycles of light-digital PCR reaction were performed, a result of measuring the fluorescent intensity of a PCR fluorescent material included in a sample was illustrated in FIG. 12. (a glass substrate was evaluated as a control.)

2. Evaluation of quenching prevention effect after light-digital PCR reaction for PCR fluorescent material (Fluorescein)

Figure 13:
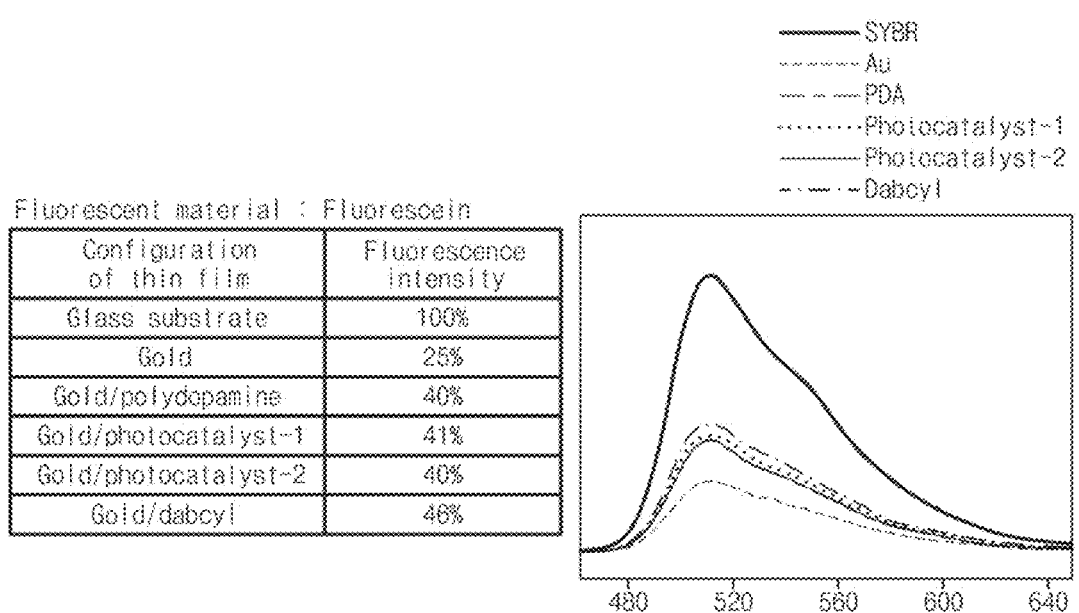
FIG. 13 is a diagram illustrating a result of evaluating a quenching prevention effect of a PCR fluorescent material after light-digital PCR reaction according to Experimental Example 6-2.
Figure 14:
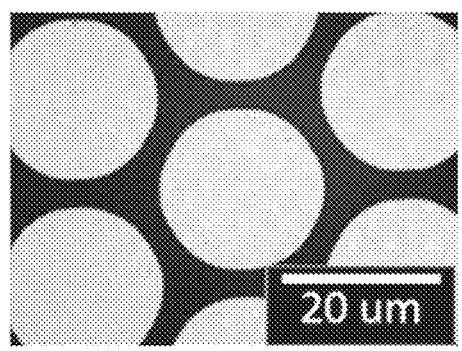
FIG. 14 is a diagram illustrating a surface photograph of a micro-patterned gold thin film of the present invention.

With respect to Examples 5, 6, 7, and 8 and Comparative Example 5, after 40 cycles of light-digital PCR reaction were performed, a result of measuring the fluorescent intensity of a PCR fluorescent material included in a sample was illustrated in FIG. 13. (a glass substrate was evaluated as a control.)

According to Experimental Example 6 and FIGS. 12 and 13, in the case of Examples 1 to 8 of using the polydopamine film, the photocatalyst 1 organic compound (Melem) film, the photocatalyst 2 organic compound (g-$C_3N_4$) film, or the dabcyl organic compound film as the light shielding layer, it was confirmed that even after the light-digital PCR reaction (40 cycles), the effect of preventing the quenching phenomenon of the PCR fluorescent material was excellent.

As described above, while the present invention has been described in detail with reference to the described embodiments, it is apparent to those skilled in the art that various modifications and changes can be made within the technical idea of the present invention, and it is natural that these modifications and changes belong to the appended claims.

The invention claimed is:

1. A light-digital polymerase chain reaction (PCR) chamber comprising:
   a transparent substrate configured to pass light;
   a metal thin film layer placed on a top surface of the transparent substrate;
   a light shielding layer placed on a top surface of the metal thin film layer and configured to prevent the light passing through the transparent substrate from reaching a microchannel structure layer; and
   the microchannel structure layer placed on a top surface of the light shielding layer, the microchannel structure layer including a plurality of wells, the plurality of wells each configured to accommodate a sample to be detected and perform a PCR reaction therein,
   wherein the sample within the wells of the microchannel structure layer does not directly contact with the light shielding layer,
   wherein the light shielding layer is configured to prevent the light passing through the transparent substrate from reaching the microchannel structure layer,
   wherein the light shielding layer is at least one selected from a polydopamine film, a photocatalyst organic compound film, and a dabcyl organic compound film, and
   wherein the light is visible light or infrared light.

2. The light-digital PCR chamber of claim 1, wherein the metal thin film layer is a gold thin film layer.

3. The light-digital PCR chamber of claim 1, wherein the metal thin film layer is micro-patterned.

4. The light-digital PCR chamber of claim 1, wherein the microchannel structure layer includes one or more microchannel sets.

5. The light-digital PCR chamber of claim 4, wherein each of the one or more microchannel sets includes one or more sample injection portions and one or more sample extraction portions, and a plurality of microchannels connecting the sample injection portions and the sample extraction portions.

6. The light-digital PCR chamber of claim 1, wherein the light shielding layer is at least one selected from a polydopamine film and a photocatalyst organic compound film comprising melem or g-$C_3N_4$.

7. A light-digital polymerase chain reaction (PCR) device comprising a laminate,
   wherein the laminate including:
      a transparent substrate configured to pass light;
      a metal thin film layer placed on a top surface of the transparent substrate; and
      a light shielding layer placed on a top surface of the metal thin film layer,
   wherein a microchannel structure layer is to be placed on a top surface of the light shielding layer,
   wherein the light shielding layer is configured to block the light that has passed through the laminate and prevent the light from reaching the microchannel structure layer,
   wherein the light shielding layer is at least one selected from a polydopamine film, a photocatalyst organic compound film, and a dabcyl organic compound film, and
   wherein the microchannel structure layer includes a plurality of wells within which a sample to be detected is to be distributed and a PCR reaction is to be performed,
   wherein the sample within the wells of the microchannel structure layer does not directly contact with the light shielding layer, and
   wherein the light is visible light or infrared light.

8. The light-digital PCR device of claim 7, wherein the metal thin film layer is a gold thin film layer.

9. The light-digital PCR device of claim 7, wherein the metal thin film layer is micro-patterned.

10. The light-digital PCR device of claim 7, further comprising:
    a light source below the transparent substrate of the laminate and configured to emit the light.

11. The light-digital PCR device of claim 7, wherein the light shielding layer is at least one selected from a polydopamine film and a photocatalyst organic compound film comprising melem or g-$C_3N_4$.

* * * * *